(12) United States Patent
Nishi

(10) Patent No.: US 6,411,386 B1
(45) Date of Patent: Jun. 25, 2002

(54) ALIGNING APPARATUS AND METHOD FOR ALIGNING MASK PATTERNS WITH REGIONS ON A SUBSTRATE

(75) Inventor: Kenji Nishi, Yokohama (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 09/506,742

(22) Filed: Feb. 18, 2000

Related U.S. Application Data

(63) Continuation of application No. 09/124,079, filed on Jul. 29, 1998, now abandoned.

(30) Foreign Application Priority Data

Aug. 5, 1997 (JP) .............................................. 9-210315

(51) Int. Cl.⁷ .................................................. G01B 11/00
(52) U.S. Cl. ...................................... 356/401; 356/399
(58) Field of Search .......................................... 356/401

(56) References Cited

U.S. PATENT DOCUMENTS 4,780,617 A    10/1988   Umatate et al.
5,448,332 A     9/1995   Sakakibara et al.
5,646,413 A  *  7/1997   Nishi ......................... 250/548
5,654,553 A     8/1997   Kawakubo et al.

FOREIGN PATENT DOCUMENTS

| JP | A-2-307207 | 12/1990 |
| JP | A-5-196420 | 8/1993 |
| JP | A-8-8175 | 1/1996 |
| JP | A-8-181062 | 7/1996 |

* cited by examiner

Primary Examiner—Frank G. Font
Assistant Examiner—Andrew H. Lee
(74) Attorney, Agent, or Firm—Oliff & Berridge PLC

(57) ABSTRACT

The present invention provides an alignment apparatus and method for successively bringing a plurality of shot regions to be processed on a substrate into alignment with a predetermined reference position. The invention performs a pre-alignment of the substrate and then repeatedly measures the position of wafer marks on selected preparatory sample shot regions using various coordinate systems. The invention determines the both the linear and rotational error in the position of the wafer marks relative to a predetermined reference position and determines the amount of movement of the substrate and reticle necessary to compensate for the error.

28 Claims, 10 Drawing Sheets

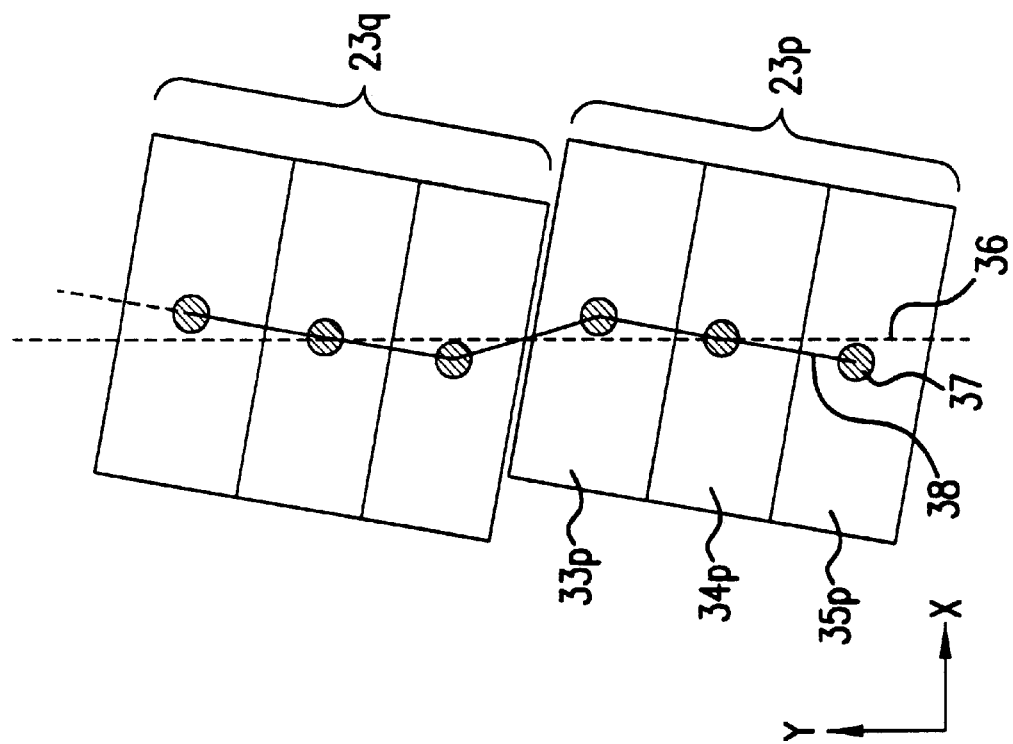
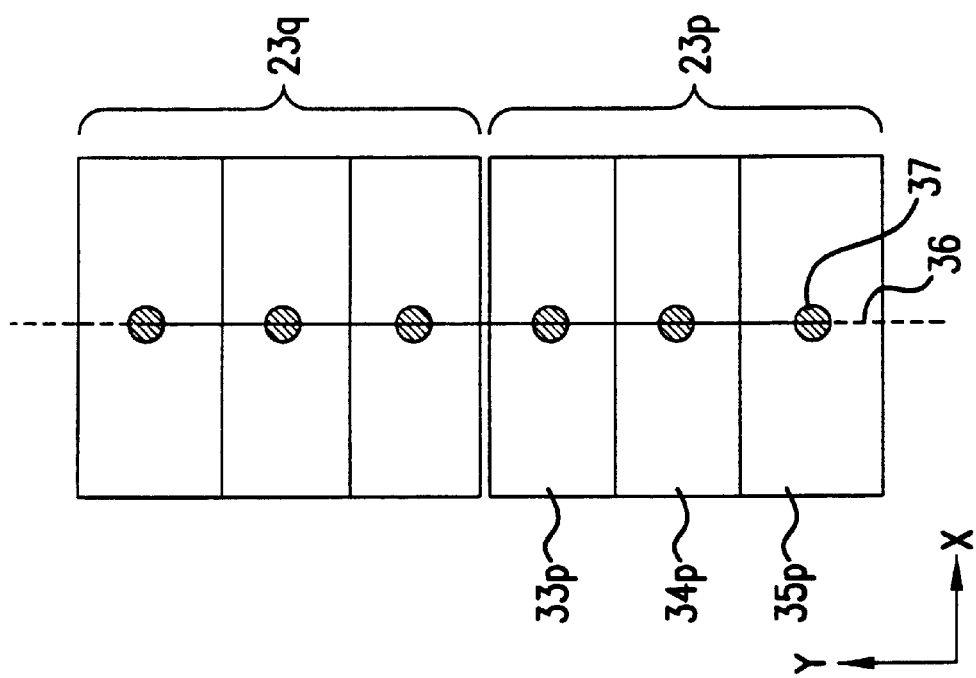

ALIGNING APPARATUS AND METHOD FOR ALIGNING MASK PATTERNS WITH REGIONS ON A SUBSTRATE

This application is a continuation of Ser. No. 09/124,079 filed Jul. 29, 1998, now abandoned.

INCORPORATION BY REFERENCE

The disclosures of the following priority application(s) are herein incorporated by reference:

Japanese Patent Application Laid Open No. 09-210315 filed Aug. 5, 1997.

BACKGROUND OF THE INVENTION

1. Field of Invention

The present invention relates to an alignment apparatus and method which permit mask patterns to be precisely aligned with pattern transfer objective regions on a substrate, in accordance with coordinates predicted on the basis of, for example, a statistical technique. More specifically, the present invention is concerned with an alignment apparatus and method suitable for use in an Enhanced Global Alignment (EGA) process.

2. Description of Related Art

Semiconductor devices and liquid crystal display devices are produced by apparatus and methods that employ a lithographic process in which a reticle pattern, i.e. a mask pattern, is transferred to successive shot regions on a wafer or a glass plate coated with a photo-resist. The lithographic process is performed using a projection optical system having a projection exposure device such as a stepper. This process requires a high degree of precision of alignment between the reticle patterns, through which the exposure is to be performed, and circuit patterns which have already been formed on the respective shot regions on the wafer.

For example, U.S. Pat. No. 4,780,617 (Japanese Patent Laid-Open No. 61-44429) discloses a method of Enhanced Global Alignment (EGA), which realizes a high degree of precision of alignment between the reticle patterns and circuit patterns. According to this method, coordinate positions of alignment marks (wafer marks), provided on preselected sample shot regions on a wafer, are measured and the results of the measurement are statistically processed to determine the coordinate positions of the shot regions.

The alignment in accordance with the EGA technique is a kind of fine alignment. In order that the fine alignment be executed satisfactorily, it is necessary that a search alignment be performed such that the wafer marks on the sample shots regions fall within the sensing coverage of the alignment sensor without fail.

FIG. 9 shows a wafer 51 on which alignment is performed in accordance with the conventional EGA technique. A multiplicity of shot regions are allocated to the surface of the wafer 51 at predetermined pitches in two orthogonal directions, which will be referred to as the X and Y directions, respectively. Preselected shot regions, e.g., three shot regions, among these shot regions are provided with different search alignment marks WX, WY and Wθ, respectively, roughly indicating the positions in the X, Y and rotational (θ) directions. Each of the other shot regions is provided with a wafer mark 55 indicative of a two-dimensional position and composed of X-axis wafer mark 54X and Y-axis wafer mark 54Y.

In the actual EGA process, the search alignment marks and the wafer marks are formed on the boundaries between adjacent shot regions. Such boundary regions are also referred to as "street regions." In the EGA process, ten shot regions C1 to C10, which are distributed substantially at a constant pitch in the circumferential direction, are selected as sample shots regions from among all the shot regions.

As the first step of the process, measurements are sequentially executed by a search alignment sensor. More specifically, the Y coordinate of the Y-axis search alignment mark WY, the Y coordinate of the θ-axis search alignment mark Wθ and the Y coordinate of the X-axis search alignment mark WX are sequentially measured. A conversion parameter composed of a rotational angle and an offset, necessary for converting the sample coordinate system on the wafer 51 into a stationary coordinate system of a wafer stage, is determined based on the results of the measurement. Coordinate positions of the sample shots are then determined on the stationary coordinate system to thereby, complete the search alignment.

Thereafter, the wafer marks 55 on the sample shots C1 to C10 are successively moved into the sensing area of a fine alignment sensor so that the coordinates of these wafer marks 55 on the stationary coordinate system are measured. The coordinates of the shot regions on the stationary coordinate system are determined through a statistical processing of the results of measurement. Exposure is then performed for each of the shot regions while aligning the shot regions in accordance with the coordinate positions on the stationary coordinate system. It is thus possible to achieve a high degree of overlay accuracy through the EGA process.

The conventional EGA alignment essentially requires a search alignment in order to ensure that the wafer marks of the sample shots fall within the sensing area of the fine alignment sensor. For example, in the case of the wafer shown in FIG. 9, it is necessary that the wafer be moved to three different positions in order to measure the positions of the search alignment marks WX, WY and Wθ. Subsequently, the wafer is moved to ten positions for the purpose of measuring the positions of the wafer marks 55 on the ten sample shots. Consequently, a considerably long time is required for the alignment. As a result, the throughput of the exposure is undesirably reduced.

Another disadvantage encountered with the known alignment process is that the area on each shot region available for the circuit pattern is limited. This is due to the necessity of using both search alignment marks and fine alignment wafer marks which are to be formed on the shot regions or on the street line regions which are defined between adjacent shot regions.

Further, a complicated positioning control is required for the wafer stage in the conventional EGA adjustment. The degree of freedom of correction is also limited because the position of each shot region is finally corrected by controlling the position of the wafer stage in accordance with the results of the fine alignment executed by using the EGA process.

SUMMARY OF THE INVENTION

The present invention provides an alignment apparatus and method for aligning the position of each of the shot regions on a wafer based on the results of a statistical processing of the measured positions of a preselected number of the shot regions on the wafer. The alignment of the present invention employs a reduced number of measurement marks and is performed in a shorter processing time, as compared with known techniques, without impairing the measuring accuracy.

According to one aspect of the present invention, there is provided an alignment apparatus and method for successively bringing a plurality of shot regions to be processed on a substrate into alignment with a predetermined reference position. The shot regions to be processed are arranged on the substrate in accordance with design array coordinates so that a mask pattern is transferred to each of the shot regions successively. In this apparatus and method, m measurement objective regions are selected from among the plurality of shot regions. The selected measurement objective regions are successively brought into a predetermined measuring area to measure the coordinates of the measurement objective regions. A statistical computation is performed on the measured coordinates of the selected measurement objective regions thereby computing a linear error of the actual coordinates of each of the shot regions on the substrate from the design array coordinates. Then, relative correction on the position to which the substrate is to be moved is performed in accordance with the computed linear error.

The alignment method of the present invention comprises: (1) selecting k pieces of a preparatory measurement objective region from among the m pieces of measurement objective region; (2) determining the array coordinates of the plurality of shot regions based on the outline of the substrate; (3) successively bringing the k pieces of preparatory measurement objective region into a predetermined measuring area in accordance with the determined array coordinates, thereby measuring the coordinate positions of the k pieces of preparatory measurement objective region; (4) processing the results of the measurement of the coordinate positions of the k pieces to calculate parts (e.g., parts of the offset and parts of the rotation) of the linear errors of the actual array coordinates of the plurality of shot regions with respect to the design array coordinates; (5) updating the measured coordinate positions in accordance with the results of the calculation; (6) successively bringing (m–k) pieces of the measurement objective region (B1 to B8) into the predetermined measuring area based on the array coordinates corrected in accordance with the computed linear errors, thereby measuring the coordinate positions of the (m–k) pieces of the measurement objective regions; and (7) performing a statistical computation on the updated coordinate positions and the measured coordinate positions of the (m–k) pieces of the measurement objective regions, thereby computing the linear error of the actual coordinates of each of the plurality of shot regions from the design coordinates.

The alignment method of the present invention has been accomplished with alignment sensors having wide sensing areas with which high degrees of accuracy can be achieved in the rough alignment (pre-alignment) process based on the object outline employed in wafer loader systems of exposure apparatuses. Thus, in the pre-alignment of the present method, the array coordinates of the shot regions to be processed are determined with such an accuracy that causes alignment marks attached to the measurement objective shot regions to fall within a sensing area sensible by an alignment sensor which is employed in the subsequent steps. It is therefore not necessary to employ a separate step of search alignment for the purpose of enabling the sensing area of the alignment sensor to encompass the alignment marks, as is required in the known prior art processes. Consequently, the number of the marks to be used can be reduced because the marks which are used for search alignment in the known processes can be eliminated.

However, if the alignment sensor is of an image processing type, there is a risk that errors are involved in the positions detected at a peripheral region of the sensing area due to distortion of the image forming optical system. Prolongation of the detection time, as well as an increase in the detection error, tends to occur even with other types of alignment sensors if the alignment marks are positioned in a peripheral region of the sensing area.

Therefore, in accordance with the method of the present invention, the positions of the k pieces of preparatory measurement objective regions are successively measured, and the parts of the linear errors, such as offset and rotation, are then determined. Thus, correction based on the determined linear errors has been effected on the determined coordinate positions when the positions of the remaining measurement objective regions are measured. Therefore, the alignment marks carried by these measurement objective regions are located in the vicinity of the center of the sensing area provided by the alignment sensor. Consequently, the detection error can be reduced and, since the alignment marks are detectable from a smaller area around the center of the sensing area, the time required for the detection is also reduced.

Further, the results of the measurement of the positions of the k pieces of preparatory measurement objective regions obtained through the correction performed in the fourth step, are used in the computation of the final linear error. This permits the number of the alignment marks of the measuring objects to be reduced almost to the same number as that employed in the fine alignment step of the known process. Consequently, the number of the marks to be measured and hence, the processing time inclusive of the measuring time, are reduced.

Preferably, the fourth step is executed such that the k pieces of preparatory measurement objective regions are again brought into the predetermined sensing area, based on the array coordinates corrected based on the calculated linear error, so that the coordinate positions of the preparatory measurement objective regions are measured again to update the data concerning the coordinate positions. This repeated measurement offers a higher accuracy of the measurement because the second measurement is performed while the alignment marks on the k pieces of preparatory measurement objective regions are located sufficiently close to the center of the sensing area presented by the alignment sensor.

In accordance with another aspect of the invention, the alignment method of the first aspect employs, as the k pieces of preparatory measurement objective regions, a first preparatory measurement objective region and a second preparatory measurement objective region. In addition, the third and fourth steps include the steps of: bringing the first preparatory measurement objective region into the predetermined measuring area-based on the array coordinates determined in the first step, thereby measuring the coordinate position of the first preparatory measurement objective region; processing the results of the measurement of the coordinate position to compute an offset which is a component of the linear error of the actual array coordinates of the plurality of shot regions; correcting the array coordinates in accordance with the computed offset; measuring the coordinate position of the first preparatory measurement objective region again based on the array coordinates corrected in accordance with the computed offset; bringing the second preparatory measurement objective region into the predetermined measuring area based on the determined array coordinates determined, thereby measuring the coordinate position of the second preparatory measurement objective region; and processing the results of the measurement of the coordinate position of the second preparatory measurement objective region to compute an angle of rotation which is another component of the linear error of the actual array coordinates of the plurality of shot regions; correcting the array coordinates in accordance with the computed rotation angle; and measuring the coordinate position of the second preparatory measurement objective region again based on the array coordinates corrected in accordance with the computed rotation angle.

These features achieve the correction of offset and rotation, through the measurement of positions of two preparatory measurement objective regions. Such a correction improves the accuracy of measurement of the remaining measurement objective regions.

In the alignment method of the present invention, the linear error calculated in the fifth step may be corrected through a control of the position of the mask pattern. Exposure apparatus perform a demagnification projection at an image contracting ratio of approximately 1/4 or 1/15. Thus, if the laser interferometer associated with the mask and the laser interferometer associated with the substrate have almost the same detection accuracy, an error of detection performed by the laser interferometer associated with the mask appears on the substrate in a magnitude reduced at the same ratio as the demagnification performed by the projection exposure apparatus. Therefore, when the projection is conducted in a manner to demagnify the mask pattern image, it is preferred that the correction of position be effected by controlling the position of the mask pattern so that misalignment can be effectively reduced.

The correction of misalignment through the control of the mask pattern position offers a higher speed of alignment as compared with the case where the correction is effected merely by the control of position of the substrate. Furthermore, the accuracy of correction of non-linear errors can be improved corresponding to the projection demagnification, when the correction is performed through the control of the mask pattern position.

The above and other objects, features and advantages of the present invention are described in or are apparent from the following description of the preferred embodiments.

BRIEF DESCRIPTION OF THE DRAWINGS

The invention is described in detail with reference to the following figures wherein like reference numerals designate similar items, and wherein:

FIG. 7A is an illustration of an overlay exposure conducted when there is no shot rotation in a first layer;

FIG. 7B is an illustration of an overlay exposure conducted when there is a shot rotation in a first layer;

DETAILED DESCRIPTION OF PREFERRED EMBODIMENTS

An embodiment of the alignment method in accordance with the present invention will be described with reference to FIGS. 1 to 8.

Figure 1:
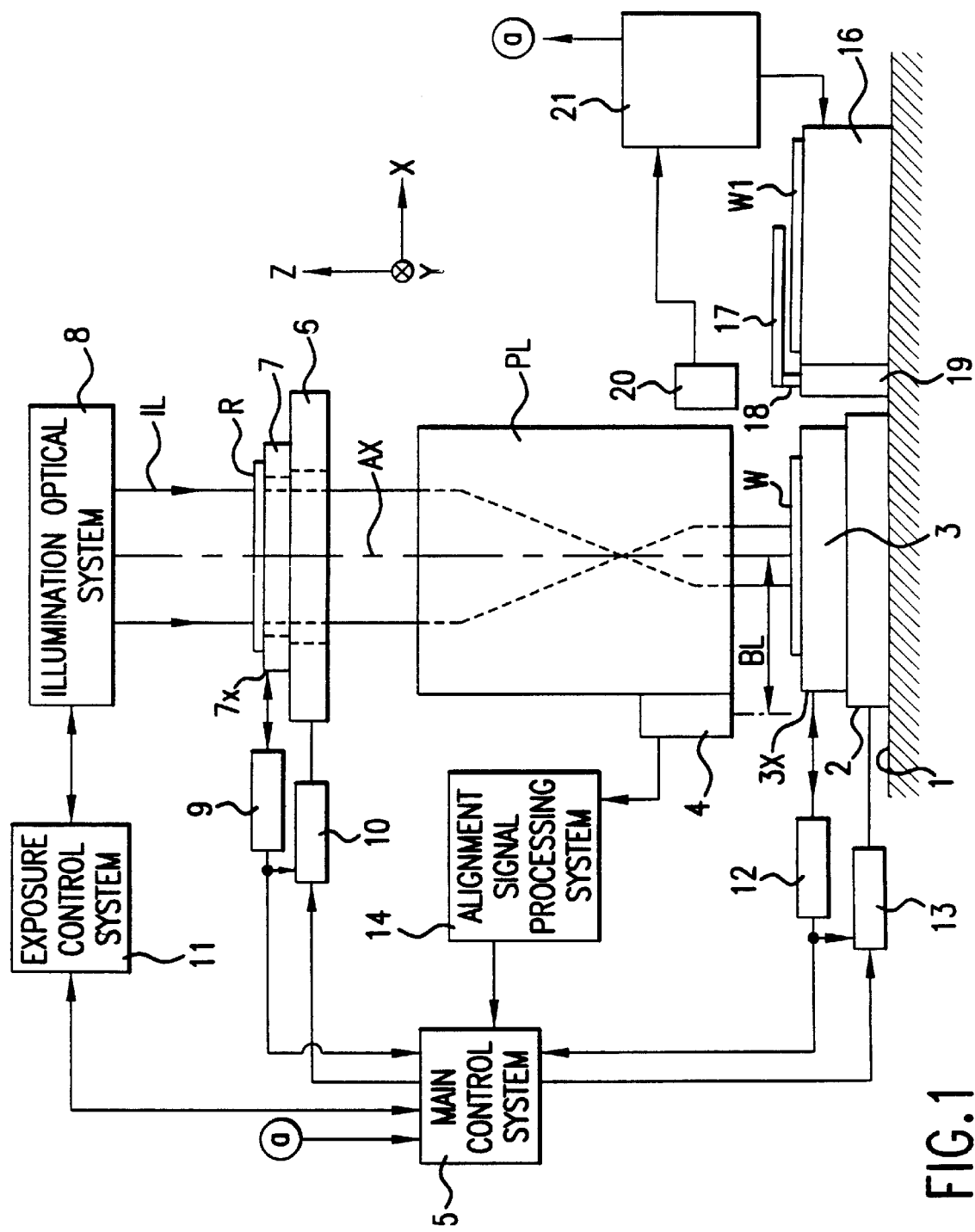
FIG. 1 is a schematic illustration of the construction of a projection exposure apparatus of a preferred embodiment of the present invention.

FIG. 1 shows a projection exposure apparatus according to a preferred embodiment of the present invention. The projection exposure apparatus has an illumination optical system 8 which includes an exposure light source such as a mercury lamp or an excimer laser, a fly-eye lens for developing a uniform distribution of illuminance of the exposure light from the light source, an aperture, termed as a "reticle blind", for defining the area to be illuminated, a condenser lens, and so forth as is known in the art. A reticle R is illuminated with exposure light IL at a uniform illuminance distribution. The image of a pattern formed on the reticle R is projected on each shot region on the wafer W, through a both-end telecentric projection optical system PL at a projection magnification β which is, for example. 1/5, 1/4 or the like. The wafer W is coated with a photo-resist. A measuring system incorporated in the illumination optical system 8 indirectly monitors the dosage or rate of exposure on the photo-resist. A main control system 5 includes a computer which performs an overall control of the apparatus including the control of the exposure rate. Thus, the main control system 5 controls an exposure rate control system 11 which in turn controls the exposure light source so as to optimize the rate of exposure of the photo-resist.

The following description proceeds on an assumed three-dimensional space defined by a Z-axis parallel to the optical axis AX of the projection optical system PL, an X-axis which extends in a plane perpendicular to the Z-axis and which is parallel to the plane of the sheet containing FIG. 1, and a Y-axis which is orthogonal both to the X- and Z-axes. The reticle R is held by suction on a reticle stage 7 which is pneumatically supported in a floating manner on a reticle base 6 through a pneumatic bearing. The reticle stage 7 is adapted to be located in the X, Y and θ directions by actuating mechanisms such as linear motors (not shown). The reticle stage 7 has side surfaces including an X-axis mirror surface 7x and a Y-axis mirror surface. A laser interferometer 9 applies a three-axes laser beam onto these mirror surfaces of the reticle stage 7, so as to measure the X coordinate, Y coordinate and rotational angle of the reticle stage 7. The results of the measurement are delivered to a reticle stage driving system 10 and also to the main control system 5. The reticle stage driving system 10 controls the operation of the reticle stage 7 based on the measurement results and control information given by the main control system 5.

The wafer W is held by suction on a wafer holder which is not shown. The wafer holder is fixed on a Z-tilt stage 3 which in turn is fixed on an X-Y stage 2. The X-Y stage 2 is pneumatically supported in a floating manner on a surface plate 1 through a pneumatic bearing. The Z-tilt stage 3 controls the position of the wafer W along the-Z-axis (focus position control) and the angle of tilt of the wafer W, so as to bring the surface of the wafer W into alignment with the image plane of the projection optical system PL by an auto-focusing technique. The X-Y stage 2 is actuated by a suitable actuating mechanism such as linear motors (not shown) so as to move the Z-tile stage 3, and hence the wafer W, in both the X and Y directions. The Z-tilt stage 3 and the X-Y stage 2 in combination constitute a wafer stage.

The Z-tilt stage 3 has side surfaces including and X-axis mirror surface 3x and a Y-axis mirror surface. A laser interferometer 12 applies a three-axes laser beam onto these mirror surfaces of the wafer stage, so as to measure the X coordinate, Y coordinate and rotational angle of the Z-tilt stage 3. The results of the measurement are delivered to a wafer stage driving system 13 and also to the main control system 5. Hereinafter, a term "wafer stage coordinate system" or a "stationary coordinate system" will be used to designate a coordinate system (X, Y) constituted by the X and Y coordinates of the Z-tilt stage 3 (wafer W) measured by the laser interferometer 12 associated with the wafer W. The wafer stage driving system controls the operation of the X-Y stage 2 based on the measured values received from the laser interferometer 12 and control information given by the main control system 5.

The exposure on the wafer W is conducted in such a step-and-repeat manner that when exposure of one shot region on the wafer W to the pattern image light through the reticle is finished, the X-Y stage 2 is driven to bring the next shot region on the wafer W to the exposure region determined by the projection optical system PL. The next shot region is then exposed to the pattern image light. In this embodiment, the exposure process also includes actuating the reticle stage 7 to drive the reticle R, in order to compensate for part of the linear array error of the shot region positions on the wafer W introduced in the course of calculation from the results of the alignment.

In order that the exposure as described can be satisfactorily performed, preparatory alignment operation has to be conducted for each of the reticle R and the wafer W. To enable such pre-alignment operations, a pair of reference marks for the reticle R and a reference mark for the wafer W are formed on a reference mark member (not shown) which is fixed on the Z-tilt stage 3. An off-axis image processing alignment sensor 4 is fixed to a side of the projection optical system PL. The alignment sensor 4 has an illuminating system for illuminating the mark to be examined with white light, an enlarging focusing system for forming an enlarged image of the mark, and a CCD-type two-dimensional imaging device for taking up the image. Image signals from the alignment sensor 4 are delivered to an alignment signal processing system 14 which determines the amount of deviation of the mark from the center of the mark detection area and supplies the thus determined amount of deviation to the main control system 5. The X-axis and Y-axis components of the deviation are added to the X and Y coordinates of the Z-tilt stage 3, i.e., of the wafer W, detected by the laser interferometer 12 on the wafer side of the system, whereby the coordinates of the mark to be detected are determined in terms of the wafer stage coordinate system, i.e., in terms of the coordinate values of the stationary coordinate system.

After the reference mark member has been moved to a predetermined position, an operation is performed to attain alignment of the reticle R with respect to the pair of reference marks. In this operation, the position of the reference mark for the wafer is detected through the alignment sensor 4. The distance to base line BL, which is the distance between the center of the pattern image from the reticle R and the center of the sensing area of the alignment sensor 4, is determined based on the position of the reference mark detected through the alignment sensor 4. The base line distance BL is then stored in the storage area of the main control system 5. Then, the array coordinates of the shot regions on the wafer W, determined through statistical processing of the results of detection through the alignment sensor 4, are shifted by an amount corresponding to the base line distance BL to thereby register the image of the pattern on the reticle R with each shot region with a high degree of overlay accuracy.

The projection exposure apparatus used in this embodiment employs a wafer loader system that is arranged on one side of the wafer stage. The wafer loader system includes a slider system 16, through which wafers are delivered to and from a wafer conveyor line (not shown), a wafer conveyor arm 17, which receives a piece of wafer (represented by W1) from the slider system 16 and forwards the same towards the wafer stage, and an arm actuating unit 19, which causes a rotation of the wafer conveyor arm 17 about an axis presented by a rotary shaft 18. The wafer loader system further has a turn table (not shown) for receiving a wafer from the wafer transfer arm 17 for pre-alignment, a pre-alignment detection system 20 for detecting the position and rotational angle of the wafer on the turn table, and a pre-alignment control system 21 which controls the operations of the slider system 16, wafer conveyor arm 17 and the turn table, based on the results of the detection performed by the pre-alignment detection system 20. The pre-alignment control system 21 supplies the main control system 5 with information concerning the delivery and receipt of the wafer W1. Although not shown, another wafer conveyor arm is provided for unloading a wafer from the wafer stage.

A description will now be given of an exemplary exposure process with specific reference to the flowchart shown in FIG. 8. The process performs an enhanced global alignment (EGA) operation based on the statistical processing of the results of detection performed through the off-axis alignment sensor 4 following the above-described pre-alignment operation. In this way, each shot region is exposed to the image light of the pattern on the reticle R which correctly overlies each shot with a high degree of overlay accuracy.

Figure 8A:
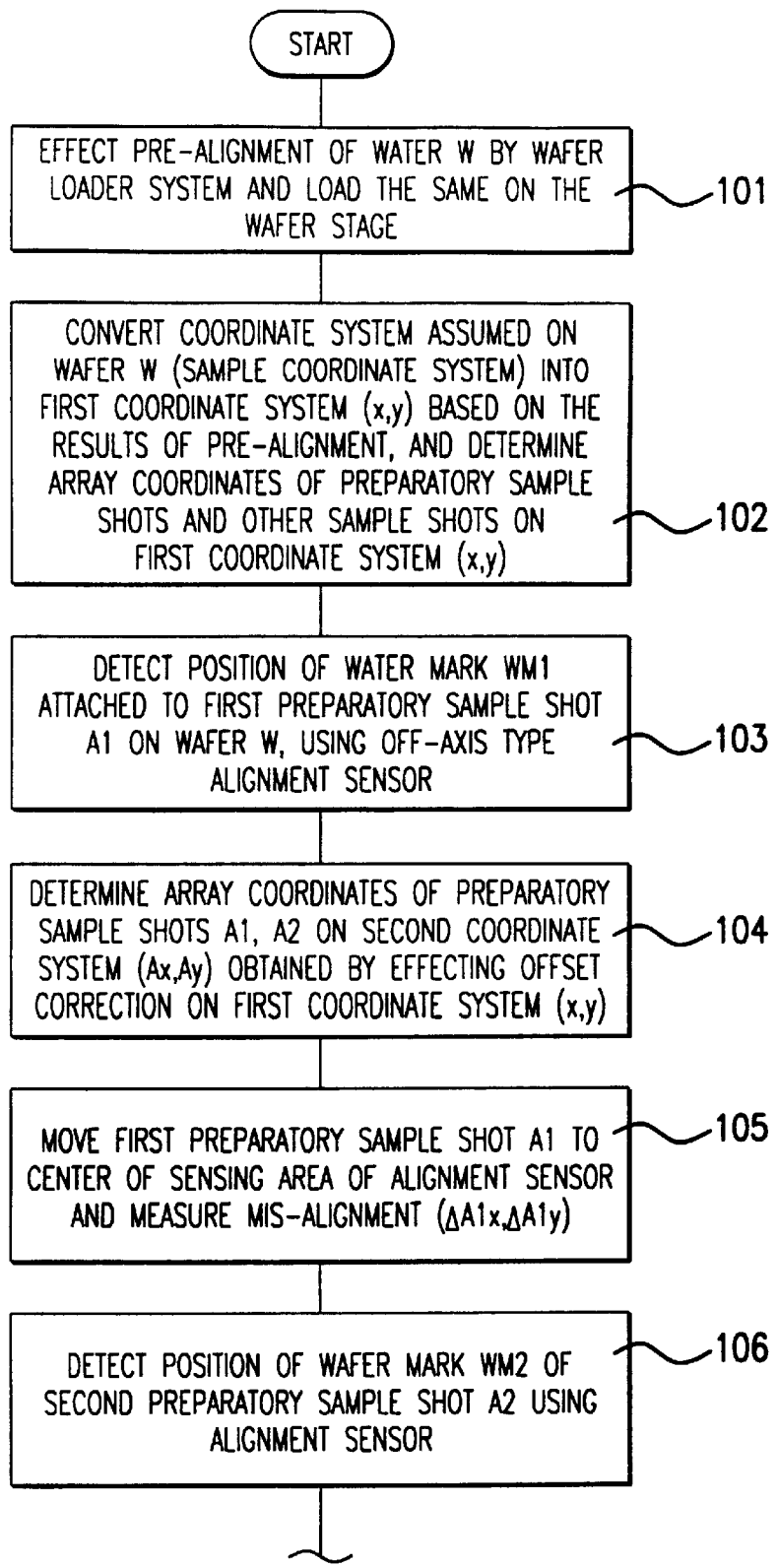
FIG. 8 is a flowchart illustrating an example of the alignment and exposure process in accordance with a preferred embodiment of the present invention.
Figure 8B:
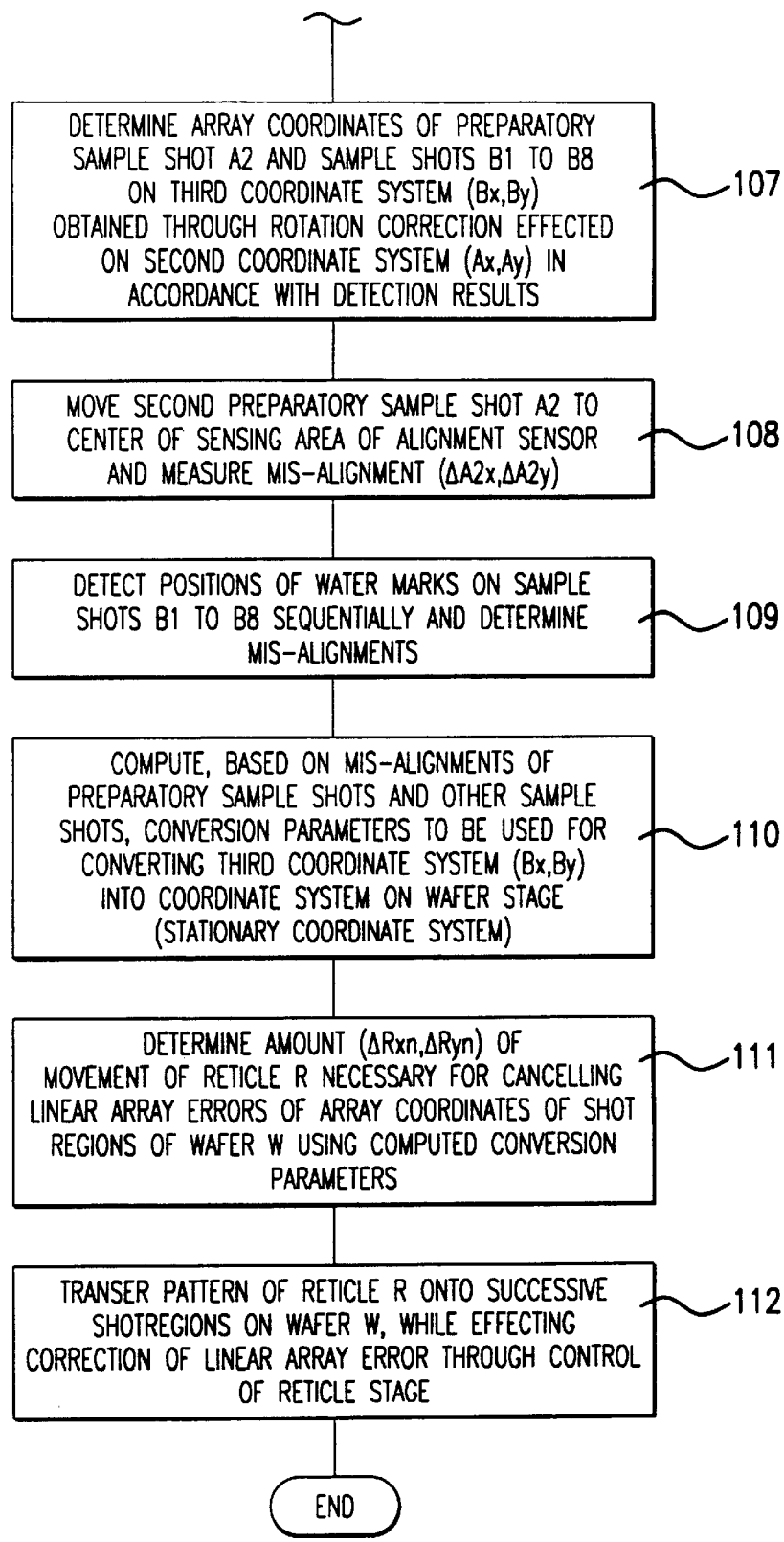
Figure 9:
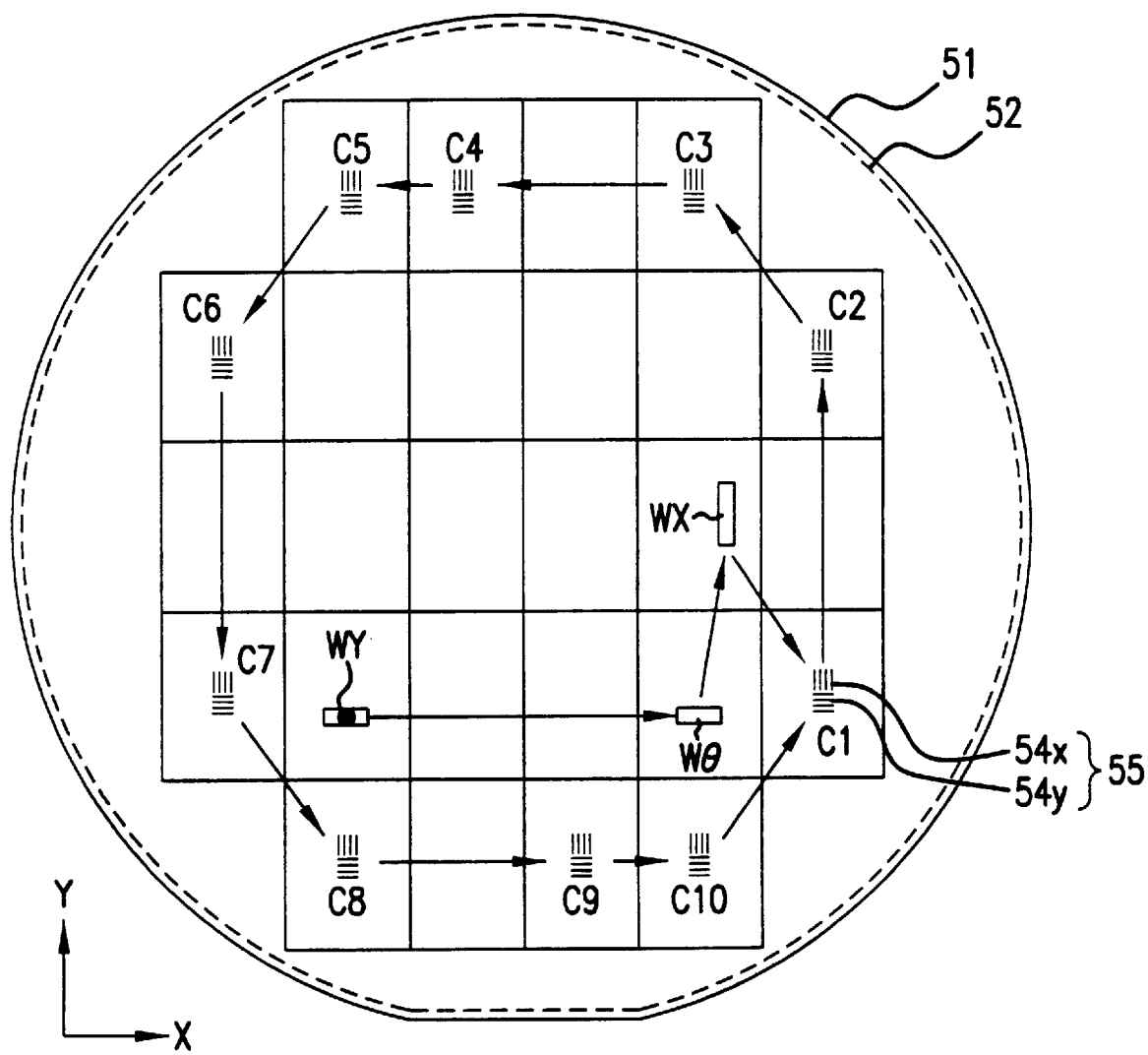
FIG. 9 is a plan view of a wafer, illustrating the sequence of measurements of positions of marks on the wafer in a search alignment and a fine alignment of a prior art process.

Referring to FIG. 1, in Step 101 of the flowchart of FIG. 8, a wafer to be exposed W is delivered from the slider system 16 of the wafer loader system to the wafer conveyor arm 17. The delivery of the wafer from the slider system 16 of the wafer loader system to the conveyor arm 17 enables the wafer W1 to be roughly located with respect to the wafer conveyor arm 17. e.g., on the order of several mm in position accuracy and several mrad in rotational precision, when a predetermined positional relationship is maintained. Such orders of accuracy, however, are still unsatisfactory for the loading of the wafer on the wafer stage. The following pre-alignment operation is therefore needed.

The wafer conveyor arm 17 to which the wafer W has been delivered is driven by the rotary shaft 18 actuated by the arm actuating unit 19, so as to convey the wafer W and to place the same on the turn table (not shown). During this operation, the pre-alignment system 20 takes up the images of three portions of the outer peripheral edge of the wafer W, one of the three positions including a notch or an orientation flat. The image signals thus obtained are processed to determine the position of the center of the wafer W, as well as the rotational angle of the wafer W. The position and the rotational angle of the turn table are then finely adjusted under the control of the pre-alignment control system 20, such that the position of the center of the wafer W and the rotational angle of the same with respect to the wafer conveyor arm 17 meet predetermined conditions. As a result of this pre-alignment operation, the wafer W is positioned with respect to the wafer conveyor arm 17 with high degrees of precision, e.g., several tens of $\mu m$ in terms of offset or position accuracy and several tens of $\mu rad$ in terms of rotational accuracy.

The wafer W, thus located on the wafer conveyor arm 17, is then transferred from the wafer conveyor arm 17 to the wafer holder (not shown) on the Z-tilt stage 3 of the wafer stage. A preceding wafer has just been exposed and unloaded immediately before the transfer of the wafer W. The Z-tilt stage 3 when receiving the wafer W from the wafer transfer arm 17 has been set at a predetermined loading position, so that the wafer W can be loaded on the Z-tilt stage 3 in a predetermined positional relationship to the Z-tilt stage 3, on condition that the delivery of the wafer W from the wafer conveyor arm 17 to the Z-tilt stage 3 is conducted while the wafer conveyor arm 17 is at a predetermined position. For example, a shot map, i.e., the coordinates of arrays of the shots on the wafer, is set in terms of design coordinates on a sample coordinate system having an origin on the center of the wafer W. Such design coordinates have been supplied in the form of a data file to the main control system 5. As a result of the above-described pre-alignment operation, the X and Y axes of the sample coordinate system are oriented substantially in parallel with the corresponding axes of the wafer stage coordinate system (stationary coordinate system). In addition, the value of the offset is roughly determined and stored in the storage area of the main control system 5.

Then, a fine alignment operation is performed in accordance with the EGA technique, through detection of the coordinates of the wafer marks on preselected shot regions on the wafer W performed by using an off-axis alignment sensor 4. In this embodiment, partly because the pre-alignment has been conducted with improved accuracy and partly because the alignment sensor 4 has a wider visual field, it is not necessary to execute a separate step of search alignment which is essential to known apparatus and methods.

It is to be noted, however, that the alignment sensor 4 may suffer from reduced accuracy of position detection, as the distance from the center of the visual field increases, due to distortion of the optical system. It is therefore desirable that the wafer mark to be detected be positioned as close as possible to the center of the detection area. Therefore, in accordance with the present invention, the wafer mark position is made to progressively approach the center of the sensing area through the following progressive coordinate converting operation.

Figure 2A:
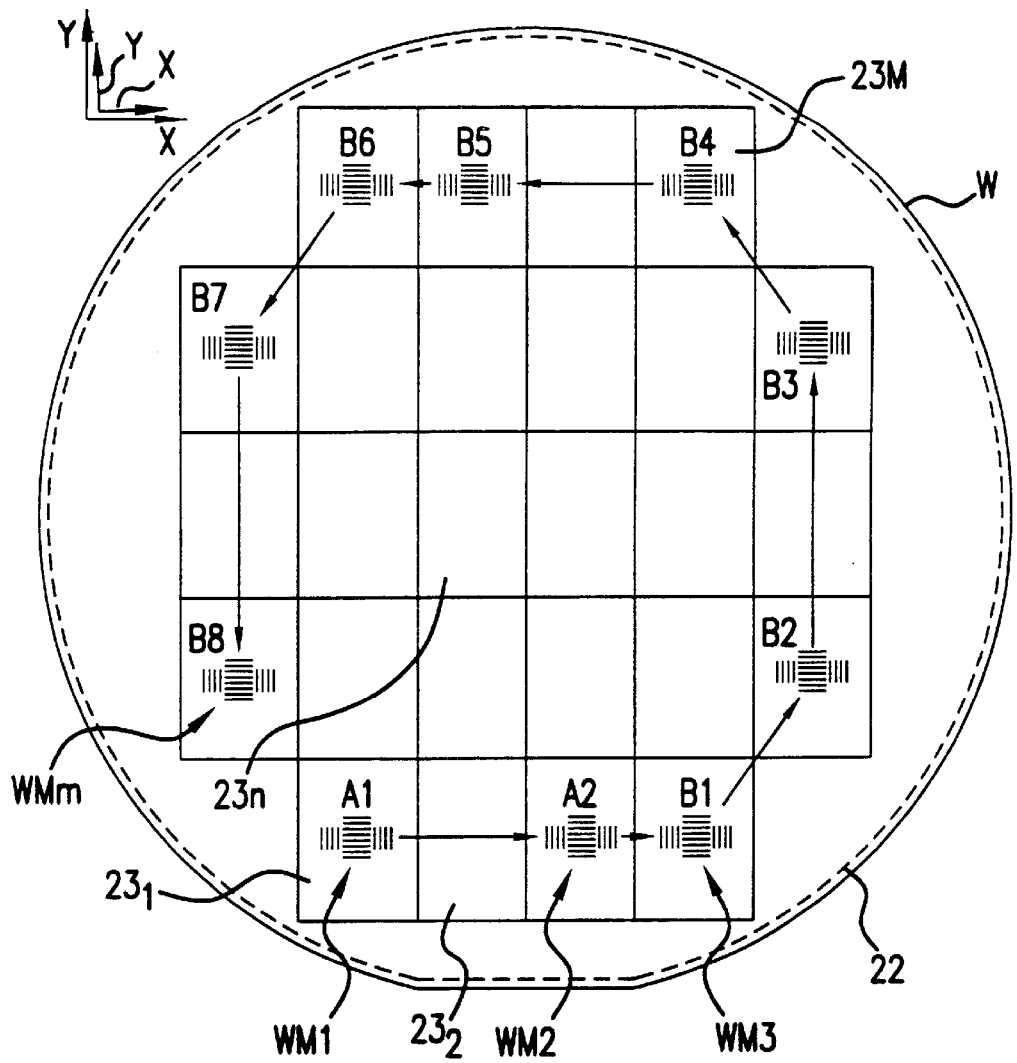
FIG. 2A is a plan view of arrays of shots on a wafer W to be exposed in accordance with a preferred embodiment of the present invention.

Referring to FIG. 2A showing arrays of the shot regions on the wafer W used in the invention, there are M shot regions $23_1$, 232, . . . , $23_M$ arranged substantially at a predetermined pitch both in the X and Y directions. In this case, M indicates an integer on the order of several tens. Each of the shot regions has a wafer mark of an identical form.

In this embodiment, ten shot regions A1, A2, B1, B2, . . . . B8, distributed substantially at a constant circumferential pitch, are selected as sample shot regions from among the M shot regions. In order that the wafer mark be positioned as close as possible to the center of the sensing area, two shot regions A1 and A2 are used as preparatory sample shot regions and the positions of these two preparatory sample shots are initially measured. The auxiliary sample shot regions A1, A2 and sample shot regions B1 to B8 are respectively provided with wafer marks WM1, WM2, WM3, . . . , WMm (m being 10 in this case). The positions of these marks are measured by means of the alignment sensor 4 in the sequence which is indicated by arrows in FIG. 2A. In this embodiment, the pair of preparatory sample shot regions A1 and A2 are spaced apart in the X direction. Thus, the wafer marks WM1 and WM2 on these two preparatory sample shot regions A1 and A2 have the same design Y coordinate value. This means that any difference of Y coordinate value between the wafer marks WM1 and WM2 corresponds to the amount of rotation of the wafer W with respect to the stationary coordinate system (X, Y).

Figure 2B:
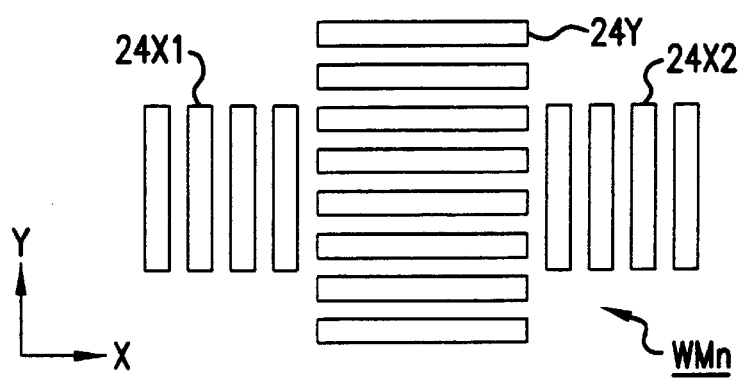
FIG. 2B is an enlarged plan view of a wafer mark provided on the wafer W.

FIG. 2B shows a representative wafer mark WMn (n being an integer from 1 to m). The wafer mark WMn is a two-dimensional mark having an Y-axis line-and-space pattern 24Y, composed of linear protrusions or recesses arranged substantially constant pitch in the Y-direction, and X-axis line-and-space patterns 24X1, 24X2 disposed on both sides of the Y-axis line-and-space pattern 24Y. Each of the patterns 24X1, 24X2 have a plurality of regular protrusions or recesses arranged substantially at a constant pitch in the X direction. The center of the Y-axis line-and-space pattern 24Y coincides with the center of the X-axis pattern composed of the X-axis line-and-space patterns 24X1 and 24X2. The X and Y coordinates of this center provides the coordinates of the wafer mark WMn. In the actual process, the wafer mark WMn is formed on a boundary (street line region) between the shot region to which the wafer mark WMn is allocated and an adjacent shot region. In this embodiment, since there is no need for additional marks which are to be exclusively used for a search alignment, it is possible to reduce the width of the street line region or to use the street line region for a different purpose.

Referring again to FIG. 2A, since the offset of the coordinates of the wafer mark and the center of the associated shot region has been determined, the following description proceeds while regarding the array coordinates of the wafer marks as being the array coordinates of the corresponding shot regions inclusive of the sample shot regions. The array coordinates, i.e., the shot map, of the shot regions on the wafer W are supplied to the main control system 5 as being the design shot map on the wafer coordinate system, i.e., the sample coordinate system.

Referring back to the flowchart of FIG. 8, the main control system 5, in Step 102, converts the sample coordinate system into a first coordinate system (x, y) on the wafer stage, based on the results of the described pre-alignment operation. This conversion is to adjust the offset of the sample coordinate system in such a manner that, under such a condition that the Z-tilt stage 3 of FIG. 3 is set at a loading position, the origin of the sample coordinate system as calculated coincides with the origin of the wafer stage coordinate system or stationary coordinate system (X, Y).

The main control system 5 then calculates the design coordinates (Dxn, Dxy) of the preparatory sample shot regions A1, A2 and the sample shot regions B1 to B8 in terms of the coordinate values on the first coordinate system (x, y) obtained through the offset adjustment as described before. In the meantime, the amount of deviation of the loading position from the center of the sensing area of the alignment sensor 4 is determined.

The process then proceeds to Step 103 where the X-Y stage 2 is driven in accordance with the design array coordinates on the first coordinate system (x, y) so as to bring the wafer mark WM1 on the first preparatory sample shot region A1 of FIG. 2 into the visual field of the alignment sensor 4. The coordinates of the wafer mark WM1 on the stationary coordinate system (X, Y) are then detected through the alignment sensor 4.

Figure 3A:
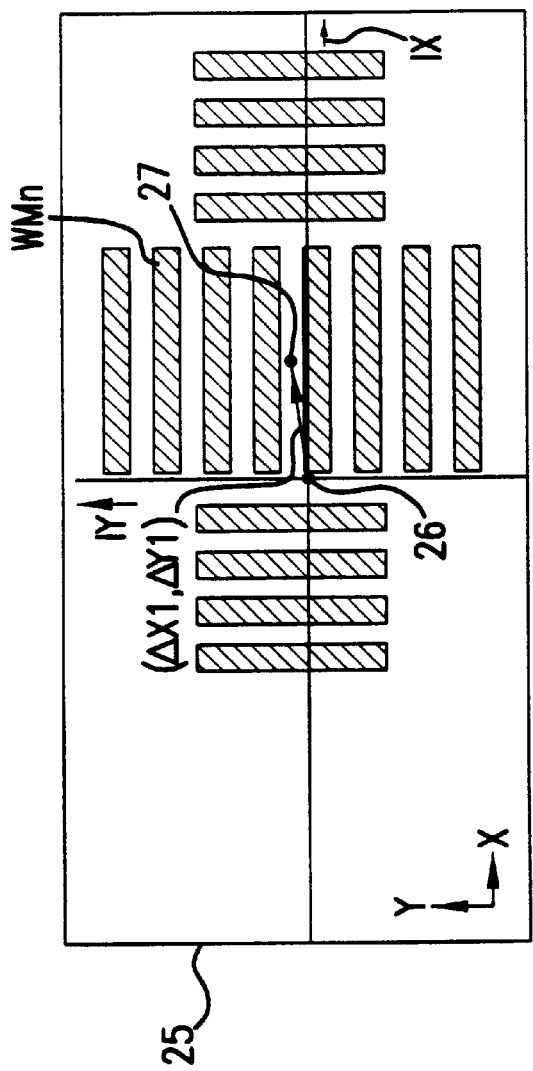
FIG. 3A is an illustration of the wafer mark within the visual field of an alignment sensor incorporated in the exposure apparatus of FIG. 1.

FIG. 3A shows the visual field 25 of the alignment sensor 4. The center 27 of the wafer mark WMn (n being 1 in this case) is deviated from the center 26 of the sensing area, i.e., the center of the visual field 25, by amounts $\Delta X1$ and $\Delta Y1$ in the X and Y directions, respectively. The alignment sensor 4 reads the images within the visual field 25 at a greater scale both in the X and Y directions and supplies the resultant image signals to the alignment processing system 14 shown in FIG. 1. Upon receipt of these image signals, the alignment signal processing system 14 detects the coordinates of the wafer mark WMn ($\Delta X1$ and $\Delta Y1$ in this case) on a relative coordinate system (IX, IY) defined by axes IX indicative of the deviation in the X direction and IY indicative of the deviation in the Y direction from the center 26 of the sensing area. The alignment signal processing system 14 then informs the main control system 5 of the results of the detection of these coordinates $\Delta X1$ and $\Delta Y1$.

Figure 4A:
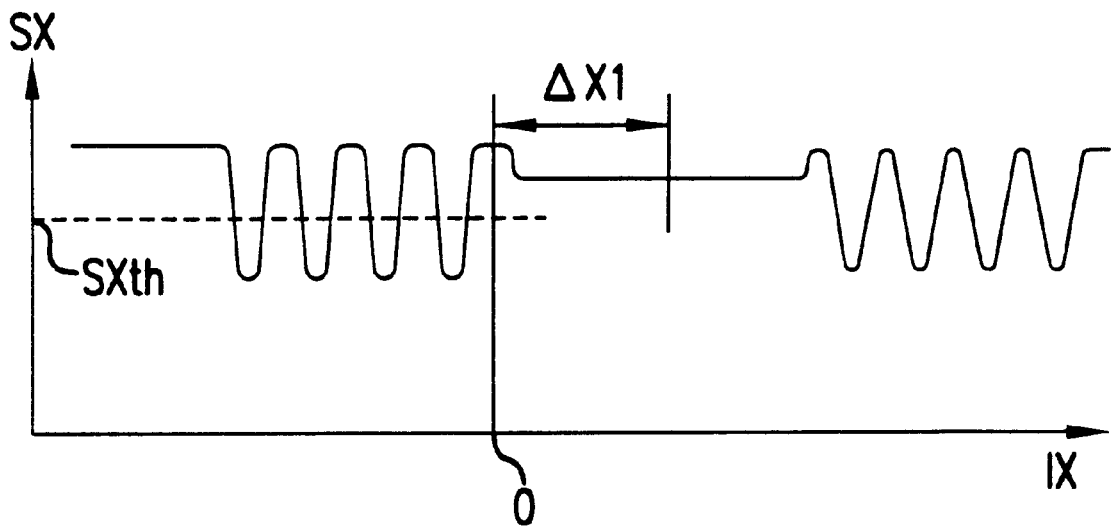
FIG. 4A is an illustration of an image signal produced from detecting the wafer mark at the position shown in FIG. 3A.

FIG. 4A shows the waveform of the X-axis image signal SX delivered by the alignment sensor 4 to the alignment signal processing system 14. The image signal SX is plotted along the relative coordinate axis IX. Actually, the image signal SX is picked up in terms of a coordinate obtained by multiplying the relative coordinate IX with the magnification factor of the image forming system. For example, the image signal SX is binarized at a predetermined threshold $SX_{th}$ and the relative coordinate of the center of the wafer mark WMn in the X direction, i.e., the coordinate value $\Delta X1$ in this case, is determined in terms of the center of a rectangular wave signal obtained through the binarization. Similarly, the relative coordinate of the center of the wafer mark WMn in the Y direction also can be determined based on the image signal obtained through reading the image in the Y direction at a greater scale. The main control system 5 then adds the coordinate values on the stationary coordinate system (X, Y) as measured by means of the wafer-side laser interferometer 12, to the received coordinate values of the center of the wafer mark WMn. In this way, the position of the wafer mark WMn on the stationary coordinate system (X, Y) is determined.

Referring again to FIG. 3A, the position of the center 27 of the wafer mark WMn has been deviated by a comparatively large amount from the center of the sensing area. This is attributable to the fact that a positioning error of several tens of $\mu$m in terms of the offset and several tens of $\mu$rad in terms of rotation remains after the pre-alignment.

The image forming system of the alignment sensor 4 contains distortion and other aberrations. In addition, the imaging device may have errors in pixel arrangement. It is therefore conceivable that the detection of position through a peripheral region of the visual field 25 may contain an error or deviation which is as large as several tens of mm from the position detection through a central region of the visual field.

In the illustrated embodiment, in order to further improve the detection accuracy, the process advances to Step 104 which assumes a second coordinate system (Ax, Ay) obtained by effecting compensation for the offset ($\Delta X1$, $\Delta Y1$) on the first coordinate system (x, y). The main control system 5 determines the coordinates (FAxn, Fayn; where n=1, 2) of the two preparatory sample shot regions A1, A2 on the second coordinate system (Ax, Ay), in accordance with the following equation (1):

$$\begin{bmatrix} FAxn \\ FAyn \end{bmatrix} = \begin{bmatrix} Dxn \\ Dyn \end{bmatrix} - \begin{bmatrix} \Delta X1 \\ \Delta Y1 \end{bmatrix} \quad (1)$$

In this equation, the coordinates (Dxn, Dyn; where n=1, 2) are design coordinates of the preparatory sample shot regions A1, A2 on the above-mentioned first coordinate system (x, y).

Figure 3B:
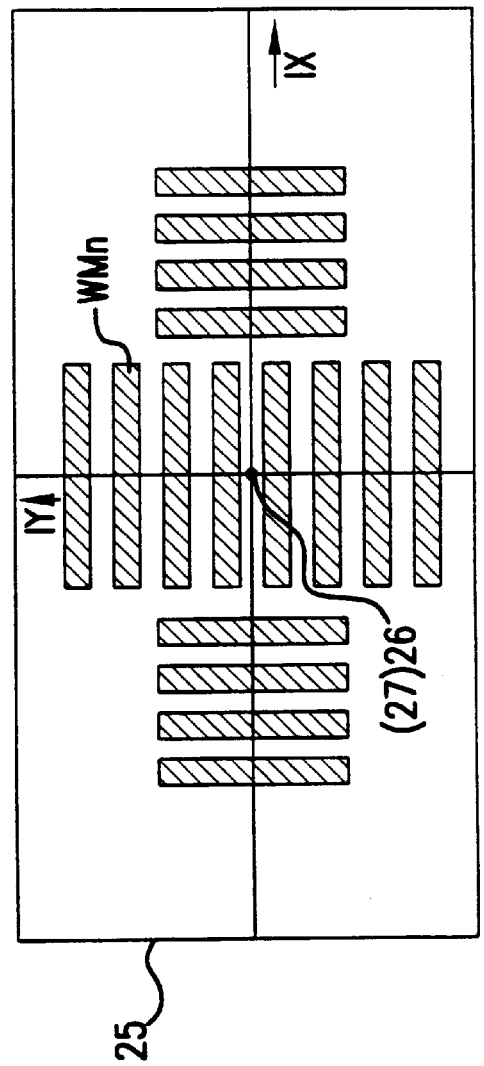
FIG. 3B is an illustration of the wafer mark moved from the position shown in FIG. 3A to the center of the visual field.

In Step 105, the X-Y stage 2 is driven in accordance with the coordinates (FAxn, FAyn) on the second coordinate system (Ax, Ay) so as to bring, as shown in FIG. 3B, the center 27 of the wafer mark WM1 (WMn) of the first preparatory sample shot region A1 into alignment with the center 26 of the sensing area of the alignment sensor 4. Then, the position of the wafer mark WM1 is measured again. Since the amount of drive of the X-Y stage 2 in this operation is as small as several tens of $\mu$m or less, the time required for the measurement of the position of the wafer mark in this operation is very short as compared with the time required for the driving/detecting operation for detecting the position of each sample shot region.

Figure 4B:
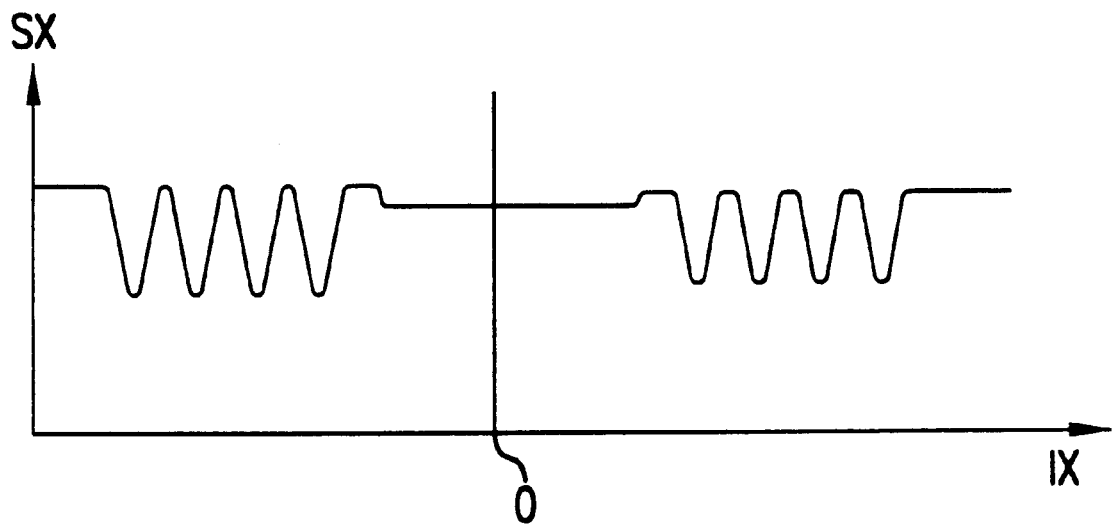
FIG. 4B is an illustration of an image signal produced from detecting the wafer mark at the position shown in FIG. 3B.

Referring to FIG. 3B, the center 27 of the wafer mark WMn (n being 1 in this case) is substantially aligned with the center 26 of the sensing area, i.e., the center of the visual field 25. In this state, the image signal SX along the X-axis has the waveform as shown in FIG. 4B. However, it is to be noted that, when the detection in the state shown in FIG. 3A contains an error due to, for example, a distortion, the center 27 of the wafer mark WMn is deviated from the center 26 of the sensing area by the amount corresponding to the error.

The amount of this deviation is detected through processing of the image signal SX of FIG. 4B by the alignment signal processing system. This amount of deviation corresponds to the alignment error (A1x, A1y) of the preparatory sample shot region A1, i.e., the error of the calculated coordinates from the actually measured coordinates. This alignment error is delivered to the main control system 5 so as to be used as one of the alignment data when the alignment is executed in accordance with the EGA method. The main control system 5 stores this alignment error in relation to the X and Y coordinates of the Z-tilt stage 3 at which the alignment error is obtained.

The process then proceeds to Step 106 in which the X-Y stage 2 is driven based on the coordinates (FAx2, FAy2) of the second preparatory sample shot region A2 on the second coordinate system (Ax, Ay) as obtained in Step 104 to thereby bring the wafer mark WM2 of the preparatory sample shot region A2 into the visual field 25 of the alignment sensor 4. The alignment signal processing system 14 detects the amounts of deviation ($\Delta X2$, $\Delta Y2$) of the wafer mark WM2 from the center of the sensing area of the alignment sensor 4 and delivers these amounts of deviation to the main control system 5.

When Step 106 is executed, no large offset such as the deviations ($\Delta X1$, $\Delta Y1$) detected in Step 103 exists anymore because such large offsets have already been corrected. However, a rotation of several tens of $\mu$rad of the wafer mark WM1 of the preparatory sample shot region A1, as observed in the pre-alignment explained in connection with FIG. 2A, may still remain. Thus, there is a possibility that the wafer mark WM2 of the second preparatory sample shot region A2 has been deviated from the center of the sensing area in the Y direction by an amount corresponding to the rotational error. Such a deviation may lead to an undesirable effect due to influence of distortion or other aberrations of the image forming system.

In order to eliminate such a risk, the process advances to Step 107 which determines any rotational error of the wafer W which may remain with respect to the stationary coordinate system (X,Y). To this end, Step 107 computes the value ($\Delta Y2-\Delta A1y$) by subtracting the Y coordinate $\Delta A1y$ of the alignment error of the wafer mark WM1, as determined in Step 105, from the Y coordinate $\Delta Y2$ of the positional deviation of the wafer mark WM2.

Next, the rotation angle ($\Delta Y2-\Delta A1y$)/L is determined by dividing the calculated difference ($\Delta Y2-\Delta A1y$) by the X direction distance L between the wafer mark WM1 and the wafer mark WM2. The distance can be approximated by the pitch of stepping of the X-Y stage 2 in the X direction.

Then, a third coordinate system (Bx, By) is assumed. This third coordinate system (Bx, By) is obtained by effecting a compensation on the second coordinate system (Ax, Ay) for the angle of rotation. The main control system 5 determines the coordinates (FBxn, Fbyn; where n is 1 to 10) of the preparatory sample shot region A2 and the sample shot regions B1 to B8 on the third coordinate system (Bx, By) using the following equation (2):

$$\begin{bmatrix} FBxn \\ FByn \end{bmatrix} = \begin{bmatrix} Dxn \\ Dyn \end{bmatrix} - \frac{\Delta Y2 - \Delta A1y}{L} \begin{bmatrix} -(Dyn - Dy1) \\ Dxn - Dx1 \end{bmatrix} - \begin{bmatrix} \Delta X1 \\ \Delta Y1 \end{bmatrix} \quad (2)$$

It is to be noted that the computation in accordance with the above equation employs the coordinates of the center of rotation, i.e., the design coordinates (Dx1, Dy1) of the first wafer mark WM1 on the first coordinate system (x, y). The second term of the right side of this equation, the X and Y components have been transposed in order to express the influence of the rotational error. The value of the second term is zero for the first preparatory sample shot region A1, so that the coordinates values are the same as those determined by the preceding equation (1). Therefore, it is not necessary to conduct the calculation under equation (2) for the first preparatory sample shot region A1.

The process then advances to Step 108 in which the X-Y stage 2 is finely moved in accordance with the coordinates (FBx2, FBy2) of the second preparatory sample shot region A2 calculated in Step 107 to thereby move the wafer mark WM2 of the preparatory sample shot region A2 toward the center of the sensing area of the alignment sensor 4. In this case, since most parts of the offset and the rotational error remaining after the pre-alignment have been corrected, the center of the wafer mark WM2 has been located substantially at the center of the sensing area so that the detection of the position can be performed with a very high degree of accuracy.

More specifically, the amount of deviation of the wafer mark WM2 from the center of the sensing area is measured again by the alignment signal processing system 14. The amount of deviation thus measured is supplied to the main control system 5, as the alignment error ($\Delta A2x, \Delta 2y$) of the preparatory sample shot region A2. The alignment error ($\Delta A2x, \Delta A2y$), together with the X and Y coordinates of the Z-tilt stage 3 at which this error was measured, is used as one of the data of the alignment to be conducted in accordance with the EGA method.

The use of the coordinates on the third coordinate system (Bx, By) serves to cancel most parts of the offset and the rotational error which have remained after the pre-alignment. Thus, an effect equivalent to that achieved through a conventional search alignment is obtained.

The process then advances to Step 109 in which the X-Y stage 2 is driven in accordance with the coordinates (FBxn, FByn; where n=3 to 10) of the sample shot regions B1 to B8 on the third coordinate system (Bx, By), so that the wafer marks WMn (n=3 to 10) attached to the eight sample shot regions B1 to B8 are sequentially brought into the visual field of the alignment sensor 4, as indicated by arrows in FIG. 2A, whereby the positions of the wafer marks WMn are detected. In this case, the amount of deviation ($\Delta Anx, \Delta Any$) of the wafer mark WMn with respect to the center of the sensing area of the alignment sensor 4 is determined as the alignment error and supplied to the main control system 5. The alignment error is stored in the main control system 5 in relation to the X and Y coordinates of the Z-tilt stage 3 at which the alignment error is determined.

Thus, measurement has been performed on 10 sample shot regions in accordance with the EGA method, including two preparatory sample shot regions A1 and A2. Since the measurement is conducted twice for each of the two preparatory sample shot regions A1 and A2, the process employs 12 measurements in total. However, the second measurement for each of the preparatory sample shot regions A1, A2 can be done in quite a short time, because the X-Y stage 2 moves only a small amount unlike the conventional search alignment which requires stepping of an X-Y stage over a long distance.

The process then advances to Step 110. This step determines the values of conversion parameters for converting the third coordinate system (Bx, By) into the stationary coordinate system (X, Y) by a least square method using the alignment errors ($\Delta Anx, \Delta Any$) on the two preparatory sample shot regions A1, A2 and the eight sample shot regions B1 to B8. Although not exclusive, in the following description, the preparatory sample shot regions A1 and A2 are regarded as being the first and second sample shot regions while the sample shot regions B1 to B8 are regarded as being the third to m-th sample shot regions. This conversion employs six linear conversion parameters namely, an X-axis scaling Sx, Y-axis scaling Sy, rotation $\theta$, perpendicularity $\omega$, X-axis offset Ox and Y-axis offset Oy. The coordinates (FBxn, FByn) of the n-th sample shot region on the third coordinate system (Bx, By), as obtained through the computation in accordance with the equation (2), are converted by the following equation (3) into calculated coordinates (Fxn, Fyn) on the stationary coordinate system (X, Y).

$$\begin{bmatrix} Fxn \\ Fyn \end{bmatrix} = \begin{bmatrix} Sx & -Sx(\theta + \omega) \\ Sy \cdot \theta & Sy \end{bmatrix} \begin{bmatrix} FBxn \\ FByn \end{bmatrix} + \begin{bmatrix} Ox \\ Oy \end{bmatrix} \quad (3)$$

The X-axis scaling Sx and the Y-axis scaling Sy are determined, for example, to be 1.01 in response to a 1% elongation of the wafer length. The actual computation, however, may employ only the amount $\Delta Sx, \Delta Sy$ of change from 1.00, while neglecting the small amounts of second and higher orders.

The main control system 5 then determines the values of the six conversion parameters such that the residual error component given by the following equation (4) is minimized.

$$E = \sum_{n=1}^{m} \{(Fxn' - Fxn)^2 + (Fyn' - Fyn)\}^2 \quad (4)$$

In this equation, the measured coordinates (Fxn', Fyn') of the n-th sample shot region is expressed in terms of the sum of the alignment error (ΔAnx, ΔAny) and the coordinates (Xn, Yn) of the Z-tilt stage 3 on the stationary coordinate system (X, Y). It is therefore possible to determine the values of the six parameters Sx, Sy, θ, ω, Ox and Oy, by substituting the right-side component of the equation (3) including the linear parameters for the calculated coordinates Fxn, Fyn in the equation (4) and then applying the least square method.

In Step 111, the main control system 5 converts the design coordinates on the first coordinate system (x, y) (these coordinates also are expressed by Dxn, Dyn) of all the shot regions 23, (n being 1 to M) on the wafer as shown in FIG. 2A into coordinates (FBxn, FByn) on the third coordinate system (Bx, By), in accordance with equation (2).

In the exposure of the shot regions 23, in this embodiment, the X-Y stage 2 of the wafer stage is driven and located based on the coordinates (FBxn, FByn) on the third coordinate system (Bx, By), while the linear array error relative to equation (3) is canceled by the driving of the reticle R. The following equation (5) employing the projection magnification, determines the amount (ΔRxn, ΔRyn) of movement of the reticle R required for canceling the linear array error in terms of the difference between the coordinates (Fxn, Fyn) calculated by substituting the six conversion parameters calculated in Step 110 for the equation (3) and the coordinates (FBxn, FByn) on the third coordinate system (Bx, By).

$$\begin{bmatrix} \Delta Rxn \\ \Delta Ryn \end{bmatrix} = \left\{ \begin{bmatrix} Sx & -Sx(\theta + \omega) \\ Sy \cdot \theta & Sy \end{bmatrix} \begin{bmatrix} FBxn \\ FByn \end{bmatrix} + \begin{bmatrix} Ox \\ Oy \end{bmatrix} - \begin{bmatrix} FBxn \\ FByn \end{bmatrix} \right\} \times \frac{1}{\beta} \quad (5)$$

$$= \left\{ \begin{bmatrix} Sx-1 & -Sx(\theta + \omega) \\ Sy \cdot \theta & Sy-1 \end{bmatrix} \begin{bmatrix} FBxn \\ FByn \end{bmatrix} + \begin{bmatrix} Ox \\ Oy \end{bmatrix} \right\} \times \frac{1}{\beta}$$

In this equation, the amount of movement of the reticle R (ΔRxr, ΔRyn) represents the amounts of movement of the stationary coordinate system (X, Y) in the X and Y directions. In addition, since the projection optical system PL performs an inverted projection, the linear array error can be canceled even when the amounts of movements of the equation (5) have positive sign.

In Step 112, the main control system 5 drives and locates the X-Y stage 2 of the wafer stage in accordance with values determined by dividing the coordinates (FBxn, FByn) on the third coordinate system (Bx, By) by the base line distance BL which is known. At the same time, the control system 5 operates to drive the reticle stage 7 and locates the same at a position which is spaced by the amount (ΔRxn, ΔRyn) given by the equation (5) from the reference position at which the base line distance BL was measured. In this manner, the image of the pattern on the reticle R is transferred to the successive shot regions 23n (n=1 to M) on the wafer W, through the projection optical system PL to thereby complete the exposure on one wafer W.

As will be understood from the foregoing description, the present invention does not employ any additional step for search alignment which is conducted separately from the fine alignment in the known prior art process. Thus, the number of wafer marks to be measured through stepping of the wafer stage is reduced as compared with the known prior art process which employs the step of search alignment. Thus, the time required for achieving the alignment is shortened so as to offer improved throughput.

In addition, detection of the preparatory sample shot regions A1, A2 and the sample shot regions B1 to B8 is performed through the portion of the alignment sensor 4 near the center of the sensing area, because the positions of the sample shot regions B1 to B8 are corrected based on the results of preceding measurement of positions of the two preparatory sample shot regions A1, A2 and because the positions of the preparatory sample shot regions A1 and A2 are measured two times. This reduces the undesirable effects which otherwise may be caused by, for example, distortion of the image forming system, thus contributing to the improvement in the measuring accuracy. The second measurement of the positions of the preparatory sample shot regions A1, A2 requires only fine movements of the wafer stage without necessitating any stepping motion of the wafer stage. Therefore, the total measuring time is not substantially increased despite the repeated measurements.

In the illustrated embodiment, the reticle R rather than the wafer W is moved by the amount (ΔRxn, ΔRyn) given by the equation (5) in order to compensate for the linear array error. This correction method offers an advantage which will now be described with reference to FIG. 5.

Figure 5:
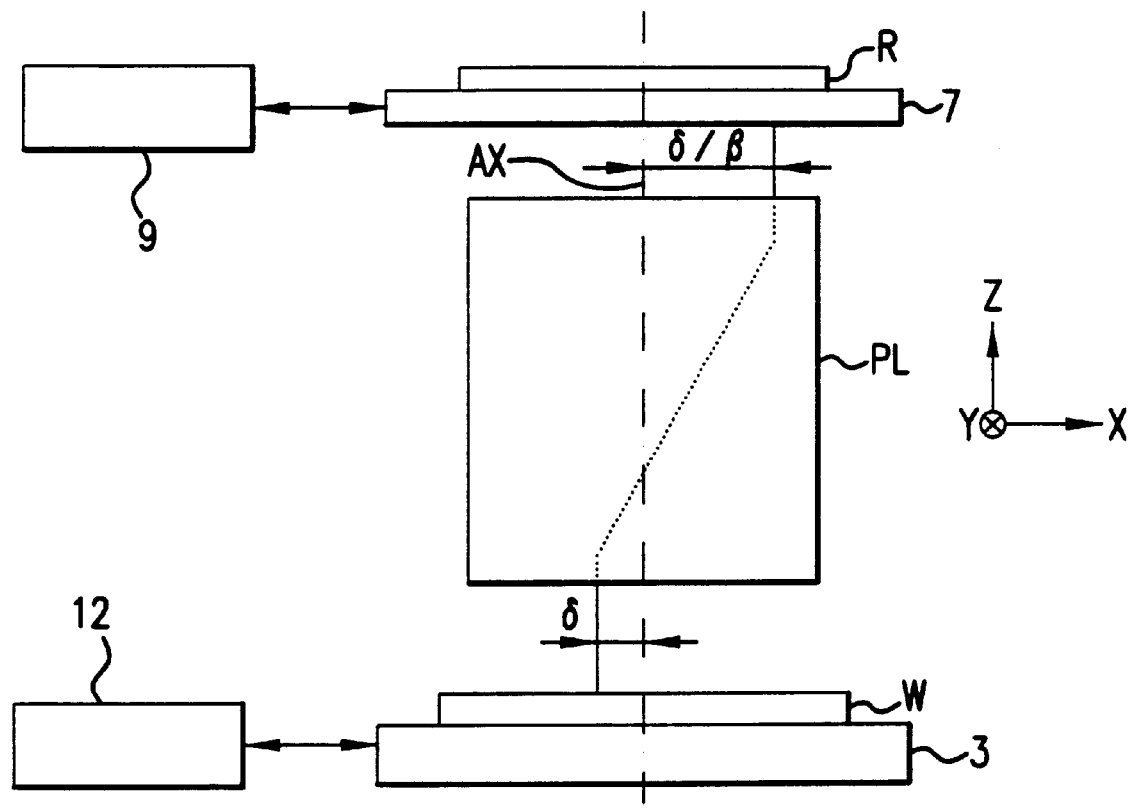
FIG. 5 is a schematic illustration of the exposure apparatus illustrating that an offset of the position of a reticle R appears in a reduced amount on the wafer W.

FIG. 5 schematically shows the reticle stage system and the wafer stage system incorporated in the apparatus shown in FIG. 1. As shown in FIG. 5, the projection magnification β is a demagnification factor (β<1). The value of β is assumed here to be ¼. In order to maintain the conjugate relation between the reticle R and the wafer W when the Z-tilt stage 3, and thereby the wafer W, is moved by an amount δ in the -X direction, it is necessary that the reticle stage 7, and thereby the reticle R, be moved by the amount δ/β, i.e., 4δ in this case, in the +X direction. In this embodiment, the laser interferometer 9 for measuring the coordinates of the retile stage 7 and the laser interferometer 12 for measuring the coordinates of the Z-tilt stage 3 are designed to have an equal level of measuring accuracy. Therefore, the correction of the linear array error effected by moving the reticle R at the accuracy ΔXR, ΔYR is equivalent to the correction of the linear array error effected by moving the wafer W at the accuracy ΔXR β (XR/4 in this case), ΔYR β. Therefore, the correction effected by moving the reticle R enables the alignment to be achieved at an accuracy or resolution which is β times finer, i.e., 1/β times greater, than that achieved when the correction is effected by moving the wafer W.

The laser interferometers 9, 12 exhibits certain oscillation of measured values due to a change in the temperature of the air medium through which the laser beam runs. If both interferometers 9, 12 exhibit an almost the same amplitude (LB of such oscillation, any effect caused on the wafer W by the oscillation is advantageously reduced to ΔLB β when the correction of linear array error is performed by moving the reticle R. This also contributes to the improvement in the accuracy of the alignment.

If the measuring accuracy of the laser interferometer 12 associated with the wafer is high, the correction of linear array error in Steps 111 and 112 of the flow shown in FIG. 8 may be effected by driving only the X-Y stage 2 of the wafer stage while keeping the reticle stage 7 stationary. To this end, Step 111 is modified such that the six conversion parameters Sx, Sy, θ, ω, Ox, Oy as calculated in Step 110 are substituted for the equation (3), so that the array coordinates (FBxn, FByn) of all the shot regions $23_n$ (n=1 to M) are converted into the array coordinates (Fxn, Fyn) on the stationary coordinate system (X, Y).

Step 112 is also modified such that the X-Y stage 2 of the wafer stage is moved in accordance with the coordinates obtained by correcting the array coordinates (Fxn, Fyn) with the base line distance, thereby aligning the shot regions on the wafer W.

A description will now be given of a case where the exposure is performed by overlaying small shot regions of a size which is ⅓ that of the shot regions 23, (referred to as "large shot regions").

Figure 6A:
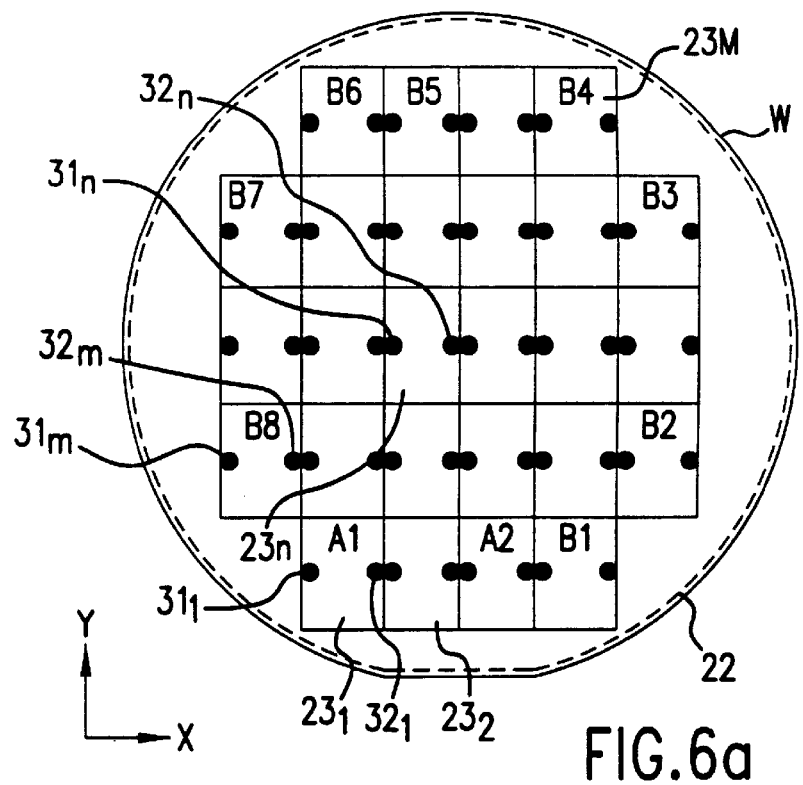
FIG. 6A is a plan view a wafer showing arrays of large shot regions corresponding to the shot arrays shown in FIG. 2A.
Figure 6B:
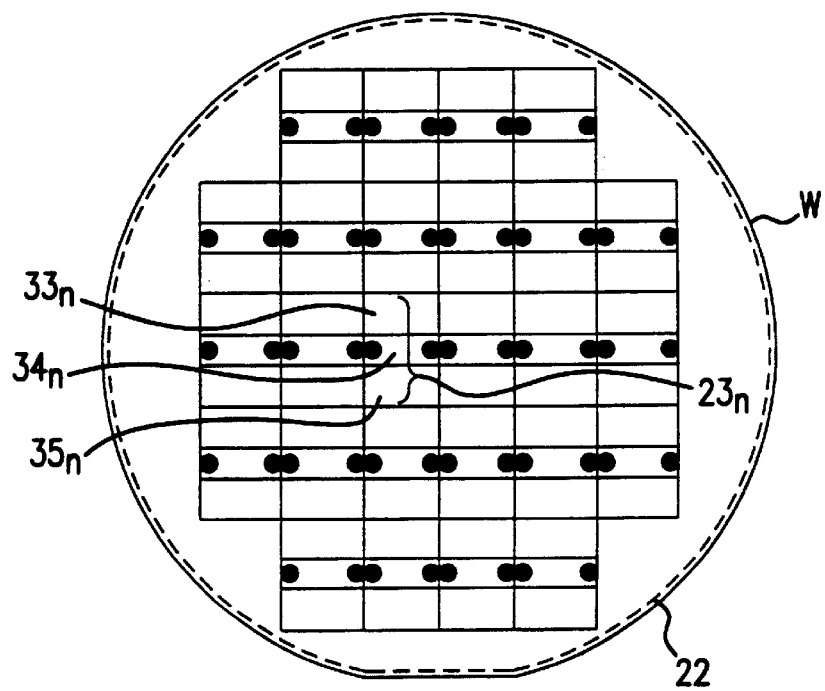
FIG. 6B is a plan view of a wafer showing arrays of small shot regions to be overlain for exposure on the shot regions of FIG. 6A.

FIG. 6A shows a shot map which is similar to that shown in FIG. 2A. In the shot map shown in FIG. 6A, shot regions $23_n$ (n=1, 2 to M), each being elongated in the Y-direction, are arrayed at constant pitches both in the X and Y directions. Each shot region $23_n$ has a pair of two-dimensional wafer marks $31_n$, $32_n$ which are spaced by a predetermined distance in the X direction and which are disposed substantially midst the shot region in the Y direction. Each of the wafer marks $31_n$, $32_n$ has orthogonal line-and-space patterns similar to those of the wafer mark WMn described before in connection with FIG. 2B. In the exposure process, reticle pattern images of a size corresponding to the three shot regions $33_n$, $34_n$, $35_n$, each having a length ⅓ that of the shot regions $23_n$ as measured in the Y direction, are superimposed on each of the shot regions $23_n$, as will be seen from FIG. 6B.

Referring again to FIG. 6A, two preparatory sample shot regions A1, A2 and eight sample shot regions B1 to B8 are selected as in the case of the embodiment describe before in connection with FIG. 2A. Positions of the pair of central wafer marks $31_1$, $32_1$, . . . , $31_m$, $32_m$ are measured for the preparatory sample shot regions A1, A2 and the sample shot regions B1 to B8. This operation enables detection of rotation of each shot region (shot rotation) along with the six conversion parameters described before in connection with FIG. 2A.

A higher aligning accuracy can be achieved by rotating the reticle R in accordance with the detected shot rotation. A mere rotation of the reticle R, however, may cause a lateral deviation when a small shot region, such as that shown in FIG. 6A, is superimposed for the exposure.

Referring to FIG. 7A, an array of shot regions $23_p$, $23_q$, having no rotation of independent shot regions, extends such that the line 36 connecting the centers of these shot regions extends in parallel with the Y-axis. In this case, superimposing the three small shot regions $33_p$, $34_p$, $35_p$ on the shot region $23_p$ for exposure can be achieved by moving the centers 37 of the shot regions $33_p$, $34_p$, $35_p$ along the above-mentioned line 36.

This, however, does not apply to the case where, as shown in FIG. 7B, each of the shot regions $23_p$, $23_q$ of the array has a shot rotation. In this case, if the exposure of the shot region $23_p$ by superimposing the three small shot regions $33_p$, $34_p$, $35_p$ is performed by moving the centers 37 of the shot regions $33_p$, $34_p$, $35_p$ along the above-mentioned line 36 while the reticle R is held in the rotated state, a deviation of the reticle pattern image in the X direction inevitably appears.

In order to overcome this problem, the centers 37 of the shot regions $33_p$, $34_p$, $35_p$ are moved along a line 38 which is inclined to the above-mentioned line 36 by an angle corresponding to the angle of shot rotation, so that each small shot region $33_p$, $34_p$, $35_p$ is shifted in the X direction by a predetermined amount. Exposure of the shot region $23_q$ also can be performed in the same way.

In this operation, a compensation for the shot rotation has to be effected by operating the reticle stage 7 while the compensation for lateral shift (offset) dependent on the shot rotation is effected by operating the wafer stage. In addition to this compensating operation, the wafer stage has to perform correction of perpendicularity and curvature of the mirror surface of the Z-tilt stage 3 as well as the array coordinates correction on the third coordinate system (Bx, By) conducted in Step 110 of the flowchart shown in FIG. 8. Thus, a complicated control is required for the wafer stage. However, since the correction of the linear array error is undertaken by the reticle position control, the burden on the control of the wafer stage is reduced correspondingly.

The embodiments described in the foregoing employs the preparatory sample shot regions A1, A2, with an aim to deal with large measurement error which may appear in the off-center portions of the observation visual field due to distortion and other aberrations existing in the optical system of the off-axis alignment sensor 4 and in the pixel arrangement of the two-dimensional imaging device. This, however, is not essential, and the arrangement may be such that the results of the position measurements are corrected in accordance with a correction map which contains data concerning the deviation of image positions attributable to the distortion and other aberrations as measured at various portions of the observation visual field. Using such a correction map offers a high degree of measuring accuracy even for the wafer marks which are spaced apart from the center of the sensing area, i.e., the visual field, thus eliminating the necessity for the use of the preparatory sample shot regions A1, A2. With this correction map, therefore, it is possible to compute the six conversion parameters, i.e., the scaling Sx, scaling Sy, rotation θ, perpendicularity ω, offset Ox and the offset Oy, without employing the steps of position measurements on the preparatory sample shot regions A1, A2.

In the embodiments as described, the tolerance or accuracy of the pre-alignment is assumed to be within several tens of μm and several tens of μrad. This involves a risk that a wafer mark or wafer marks may fail to completely fall within the measurement screen area when the amount of error exceeds the above-mentioned ranges of tolerance. In such a case, it is advisable that a two-dimensional image processing system is introduced to enable recognition of part of the mark appearing in the measurement screen area. Then, the mark is roughly aligned to the level of several tens of μm, followed by a search alignment.

In this case, however, the values of the rotation θ and the offsets Ox, Oy are comparatively large. Therefore, correction of the linear array error, when effected by moving the reticle R, may require the reticle R to be moved by an amount exceeding the upper limit of the stroke of the reticle movement. In view of this fact, the arrangement may be such that, when the value of a creation conversion parameter is expected to become large, the error attributable to such a parameter is corrected by the control of the wafer stage. The error attributable to at least one of the parameters of small values, which are in this case the scaling Sx, scaling Sy, and perpendicularity ω, is corrected through the control of the reticle. The errors relating to the scaling Sx, scaling Sy and the perpendicularity ω are array errors caused during the exposure of the first layer and errors due to deformation of the wafer incurred in the course of forming circuit patterns. The scaling Sx, as well as the scaling Sy, is usually as small as 1+several ppm, and the perpendicularity ω also is as small as several μrad. It is therefore possible to improve the overlay accuracy, while reducing burden on the wafer stage control.

In the embodiment described in connection with FIG. 8, all the six conversion parameters (X-scaling, Y-scaling, rotation, perpendicularity, X-offset and Y-offset) as determined through the computation are corrected by the control of the reticle R. This embodiment has a risk that a control error may be induced beyond the limit of movement of the reticle R. When such a control error has occurred, a complicated error recovery operation has to be conducted such as dislocation of the reticle R and change-over of the control mode to the mode for correcting the error through the control of the wafer W.

In order to eliminate this problem, the method of the described embodiment may be modified such that comparatively small errors such as the scaling error and the perpendicularity error are selectively corrected through the control of the reticle R, while other errors are corrected through the control of the wafer W. Such a modification reduces the probability of occurrence of the error recovery operation, thus achieving a further reduction of the time required for the alignment. Similar advantage is brought about when the linear array errors exceeding a predetermined amount are corrected through the control of the wafer W, while the remainder small errors are corrected through the control of the reticle R.

Although the method of the invention has been described in the form of an embodiment applied to an exposure process performed by a projection exposure apparatus of step-and-repeat type (stepper type), such an application is only illustrative and the invention can also be used for an exposure process performed by a projection exposure apparatus of step-and-scan type.

The invention can also be applied to exposure processes which employ different types of exposure apparatuses. For example, the invention can be applied to an exposure process that relies upon charged-particle beams, such as an electron beam, or a different kind of exposure light, such as X-rays.

It will thus be clear to those skilled in the art that the described embodiments are not exclusive and various changes and modifications may be imparted thereto without departing from the spirit of the present invention which is limited solely by the appended claims.

What is claimed is:

1. An alignment method that obtains positional information for a plurality or shot regions formed on a substrate by using an image processing type alignment sensor having a field of view of a predetermined region, the method comprising:

selecting a predetermined number of sample shot regions from the plurality of shot regions;

selecting a specified number of preparatory sample shot regions from the predetermined number of sample shot regions;

detecting image information within the field of view including a preparatory sample shot mark that has a predetermined positional relationship with a center of one of the preparatory sample shot regions, by the alignment sensor by relatively moving the preparatory sample shot mark into the field of view of the alignment sensor;

obtaining corrected information of the preparatory sample shot mark by correcting a unique error of the alignment sensor included in the image information;

measuring positional information of sample shot marks of each of the predetermined number of sample shot regions by sequentially relatively moving the sample shot marks of each of the predetermined number of sample shot regions which have a same shape as the preparatory sample shot mark and have a predetermined positional relationship with a center of each sample shot region into the field of view of the alignment sensor based on the corrected positional information; and obtaining positional information of each of the plurality of shot regions by statistically calculating the predetermined number of measured positional information.

2. The alignment method as set forth in claim 1, wherein the image processing type alignment sensor includes an optical system, and the unique error of the alignment sensor included in the image information includes an error due to all aberration of the optical system.

3. The alignment method as set forth in claim 1, wherein the image processing type alignment sensor includes an imaging device in which a plurality of pixels are aligned, and the unique error of the alignment sensor included in the image information includes an error due to an alignment error of the pixels of the imaging device.

4. The alignment method as set forth in claim 1, wherein, in the process that obtains the corrected positional information, after image information within the field of view including the preparatory sample shot mark is detected by the alignment sensor, and after the preparatory sample shot mark is relatively moved within the field of view of the alignment sensor, the corrected positional information is obtained by re-detecting the image information within the field of view including the preparatory sample shot mark by the alignment sensor.

5. The alignment method as set forth in claim 1, wherein the process that sequentially relatively moves the sample shot marks of each of the predetermined number of sample shot regions into the field of view of the alignment sensor based on the corrected positional information relating to the preparatory sample shot mark includes correcting the positional information of the sample shot mark that has been stored in advance.

6. The alignment method as set forth in claim 5, wherein the specified number of preparatory sample shot regions is at least two.

7. The alignment method as set forth in claim 1, wherein, when the preparatory sample shot mark is relatively moved into the field of view of the alignment sensor, and when the preparatory sample shot mark fails to completely fall within the field of view, part of the preparatory sample shot mark is recognized, and the preparatory sample shot mark is then relatively moved into the field of view.

8. An exposure process, comprising:

aligning a mask in which a pattern is formed with the substrate on which the plurality of shot regions are formed using the alignment method as set forth in claim 1, and exposing the pattern of the mask onto each of the plurality of shot regions on the substrate.

9. An alignment method including a process that obtains positional information of each of a plurality of shot regions formed on a substrate, the method comprising:

selecting a predetermined number of sample shot regions from the plurality of shot regions;

selecting a specified number of preparatory sample shot regions from the predetermined number of sample shot regions;

obtaining first positional information, which is positional information of a preparatory sample shot mark that has a predetermined positional relationship with a center of one of the preparatory sample shot regions, by detecting the preparatory sample shot mark by the alignment sensor after relatively moving the preparatory sample shot mark to a detectable region of the alignment sensor;

obtaining second positional information, which is positional information of the preparatory sample shot mark, by re-detecting the preparatory sample shot mark by the alignment sensor after relatively moving the preparatory sample shot mark so that the preparatory sample shot mark becomes closer to a center of the, detectable region of the alignment sensor, based on the first positional information;

obtaining third positional information, which is positional information of sample shot marks of each of the predetermined number of sample shot regions, by detecting the sample shot marks of each of the sample shot regions by the alignment sensor after sequentially relatively moving each of the sample shot marks which have a same shape as the preparatory sample shot mark and have a predetermined positional relationship with a center of each sample shot region, into the detectable region of the alignment sensor based on the obtained second positional information; and obtaining positional information of each of the plurality of shot regions by statistically calculating the predetermined number of the third positional information.

10. The alignment method as set forth in claim 9, wherein the second positional information is information in which a unique error of the alignment sensor that is included in the first positional information has been corrected.

11. The alignment method as set forth in claim 10, wherein the alignment sensor includes an optical system, and the unique error of the alignment sensor includes an error due to an aberration of the optical system.

12. The alignment method as set forth in claim 10, wherein the alignment sensor includes an imaging device in which a plurality of pixels are aligned, and the unique error of the alignment sensor includes an error due to an alignment error of the pixels of the imaging device.

13. The alignment method as set forth in claim 9, wherein the process in which the sample shot marks are sequentially relatively moved into the detectable region of the alignment sensor based on the second positional information relating to the preparatory sample shot mark includes correcting the positional information of the sample shot mark that has been stored in advance.

14. The alignment method as set forth in claim 13, wherein the specified number of preparatory sample shot regions is at least two.

15. The alignment method as set forth in claim 9, wherein, when the preparatory sample shot mark is relatively moved into the detectable region of the alignment sensor, and when the preparatory sample shot mark fails to completely fall within the detectable region, part of the preparatory sample shot mark is recognized, and then the preparatory sample shot mark is relatively moved into the detectable region.

16. An exposure process, comprising:
aligning a mask in which a pattern is formed with the substrate on which the plurality of shot regions are formed using the alignment method as set forth in claim 9, and
exposing the pattern of the mask onto each of the plurality of shot regions on the substrate.

17. An alignment method that obtains positional information for a plurality of shot regions formed on a substrate by using an image processing type alignment sensor having a field of view of a predetermined region, the method comprising:

selecting a predetermined number of first shot regions from the plurality of shot regions;

selecting a specified number of second shot regions from the predetermined number of first shot regions;

obtaining search information for positioning marks corresponding to the predetermined number of first shot regions at positions within the field of view of the alignment sensor, and which include marks of the second shot regions, by detecting marks which correspond to the specified number of second shot regions;

positioning the marks of the predetermined number of first shot regions, including the marks of the specified number of second shot regions that were detected in order to obtain the search information, at a position within the field of view of the alignment sensor, based on the obtained search information; and obtaining positional information of the marks, using the alignment sensor, of the predetermined number of first shot regions, including the specified number of second shot regions that were detected in order to obtain the search information, by detecting the marks of the predetermined number of first shot regions based on the obtained search information.

18. The alignment method as set forth in claim 17, wherein the position within the field of view of the alignment sensor is in a vicinity of a center of the field of view, and the marks which correspond to the predetermined number of first shot regions, and that include the marks of the specified number of second shot regions which were detected in order to obtain the search information, are positioned in the vicinity of the center of the field of view based on the obtained search information.

19. The alignment method as set forth in claim 17, further comprising performing statistical processing, based on the obtained positional information of the marks of the predetermined number of first shot regions, and obtaining positional information for the plurality of shot regions formed on the substrate.

20. The alignment method as set forth in claim 19, wherein the specified number of second shot regions is at least two.

21. The alignment method as set forth in claim 19, wherein detection of the mark of the shot regions that is performed in order to obtain the search information is performed by using the alignment sensor.

22. The alignment method as set forth in claim 21, wherein: (1) when the marks are moved relative to the field of view in order to obtain the search information, or (2) when the marks which have been detected in order to obtain the search information are subsequently positioned at the position within the field of view of the alignment sensor based on the obtained search information, if the marks fail to be completely located within the field of view, part of the marks that are located within the field of view are detected, and based on the detected information, the marks are relatively moved to the position within the field of view.

23. The alignment method as set forth in claim 22, wherein convex and concave line and space patterns arranged at a predetermined pitch in a predetermined direction are used as the marks.

24. An exposure method in which a plurality of shot regions formed on a substrate are aligned with an image of a pattern formed on a mask and the image of the pattern on the mask is transferred to the respective shot regions on the substrate, the exposure method including an alignment process comprising:

- selecting a predetermined number of first shot regions from the plurality of shot regions;
- selecting a specified number of second shot regions from the predetermined number of first shot regions;
- obtaining search information for positioning marks corresponding to the predetermined number of first shot regions at positions within the field of view of an image processing type alignment sensor having a field of view of a predetermined region, and which include marks of the second shot regions, by detecting the marks which correspond to the specified number of second shot regions;
- positioning the marks of the predetermined number of first shot regions, including the marks of the specified number of second shot regions that were detected in order to obtain the search information, at a position within the field of view of the alignment sensor, based on the obtained search information; and
- obtaining positional information of the marks, using the alignment sensor, of the predetermined number of first shot regions, including the specified number of second shot regions that were detected in order to obtain the search information, by detecting the marks of the predetermined number of first shot regions based on the obtained search information.

25. The exposure method as set forth in claim 24, wherein the position within the field of view of the alignment sensor is in a vicinity of a center of the field of view, and the marks corresponding to the predetermined number of first shot regions, and that include the marks of the specified number of second shot regions which were detected in order to obtain the search information, are positioned in the vicinity of the center of the field of view based on the obtained search information.

26. The exposure method as set forth in claim 24, further comprising:

- performing statistical processing, based on the obtained positional information of the marks of the predetermined number of first shot regions, and obtaining positional information for the plurality of shot regions formed on the substrate; and
- aligning the plurality of shot regions respectively with the image of the pattern formed on the mask, based on the obtained positional information of the plurality of shot regions obtained by executing the statistical processing and transferring the image of the pattern on the mask to the respective shot regions on the substrate.

27. The exposure method as set forth in claim 26, wherein the specified number of second shot regions is at least two.

28. The exposure method as set forth in claim 26, wherein: (1) when the marks are moved relative to the field of view in order to obtain the search information, or (2) when the marks which have been detected in order to obtain the search information are subsequently positioned at the position within the field of view of the alignment sensor based on the obtained search information, if the marks fail to be completely located within the field of view, part of the marks that are located within the field of view are detected, and based on the detected information, the marks are relatively moved to the position within the field of view.

* * * * *